Figure 1:
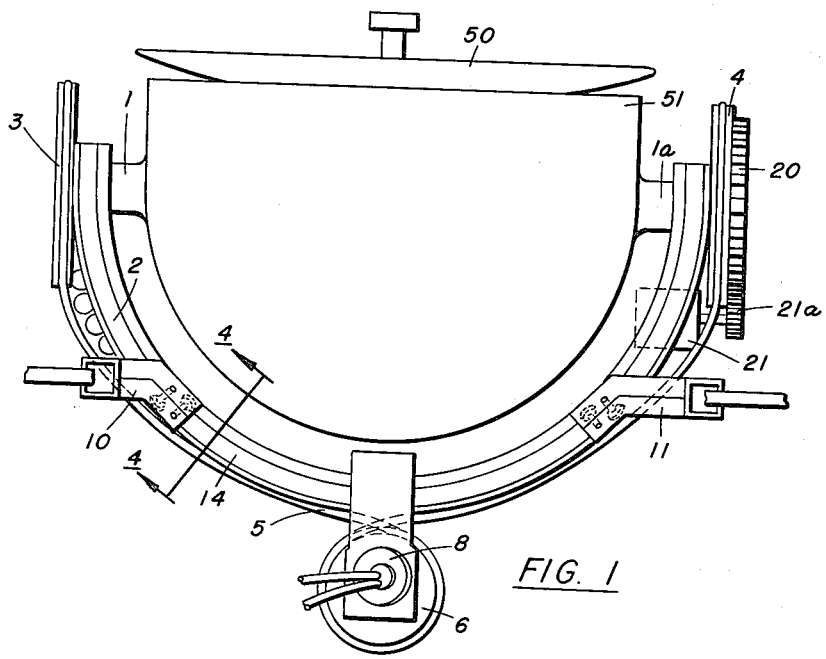

Sept. 29, 1953    W. D. MULLINS, JR., ET AL    2,654,031
ANTENNA MOUNT
Filed March 27, 1950    3 Sheets-Sheet 1

INVENTORS
WILLIAM D. MULLINS, JR.
CHARLES K. WEST
JOHN M. SLATER
GERALD S. PERKINS
BY William R. Lane
ATTORNEY Sept. 29, 1953　　　W. D. MULLINS, JR., ET AL　　　2,654,031
ANTENNA MOUNT Filed March 27, 1950　　　　　　　　　　　　3 Sheets-Sheet 2

INVENTORS
WILLIAM D. MULLINS, JR.
CHARLES K. WEST
JOHN M. SLATER
GERALD S. PERKINS
BY William R. Lane
ATTORNEY Patented Sept. 29, 1953

2,654,031

UNITED STATES PATENT OFFICE 2,654,031

ANTENNA MOUNT

William D. Mullins, Jr., Downey, Charles K. West, Santa Monica, John M. Slater, Inglewood, and Gerald S. Perkins, Altadena, Calif., assignors to North American Aviation, Inc.

Application March 27, 1950, Serial No. 152,026

9 Claims. (Cl. 250—33.65)

This invention pertains to directing or aiming a beam of radiant energy, and particularly to a novel means for mounting a radar antenna so that it may be trained, elevated or depressed so as to point in any desired direction.

Radar apparatus designed to cause a beam of radiant energy to track a target automatically requires two types of motion to keep the beam trained on the target. The first is an oscillatory motion of restricted amplitude centered on the target and required to generate signals adequate to servo the apparatus to the target. The second is a less rapid motion of greater amplitude required to train on the target and to keep the radar pointed in the general vicinity of the target. The first motion requires that the radar antenna be oscillated about a point very close to the reflector itself. It can therefore be seen that the support scheme for the radar antenna must also be adequate to support oscillating means for the antenna and other related heavy mechanical and electrical equipment. The second motion, though generally of slower speed, needs to be of great amplitude and must be adapted to handle a relatively large mass.

The space requirements for a radar support scheme dictate that the radar's "view" be unobstructed throughout the expected angular range of the device. In addition, if the radar is to be used in an aircraft expected to travel at high speed, the mounting device must be so devised as to minimize the size and weight of the overall installation.

It is an object of this invention to provide means for mounting a radar antenna in an aircraft.

It is a further object of this invention to provide a light-weight means for mounting a radar installation in an aircraft.

It is another object of this invention to provide an antenna mount which can be easily controlled in azimuth and elevation by means of electrical signals.

It is another object of this invention to provide a radar antenna mount which is structurally efficient and which requires a minimum of space.

It is yet another object of this invention to provide means for mounting a radar antenna and associated microwave equipment in the nose of an aircraft for two degrees of angular freedom and in a minimum space.

Figure 2:
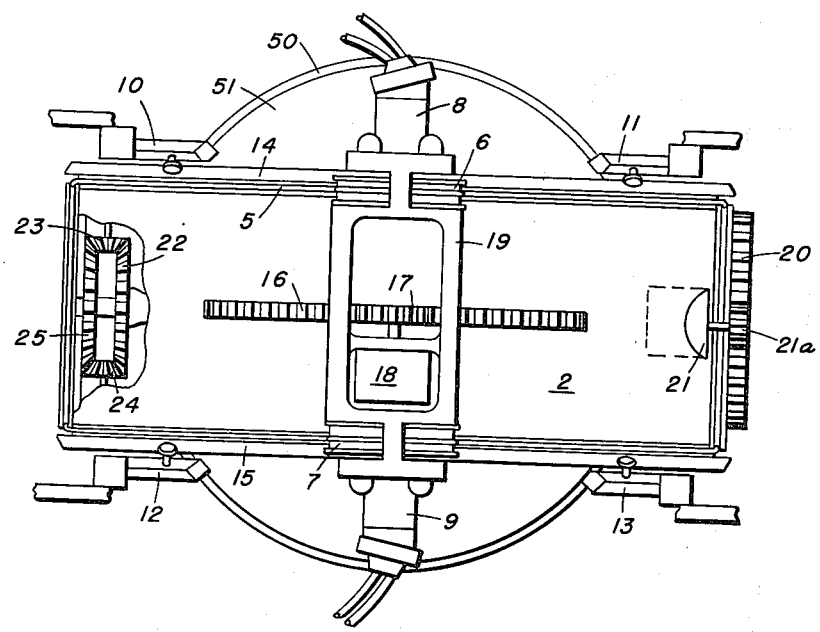
Figure 3:
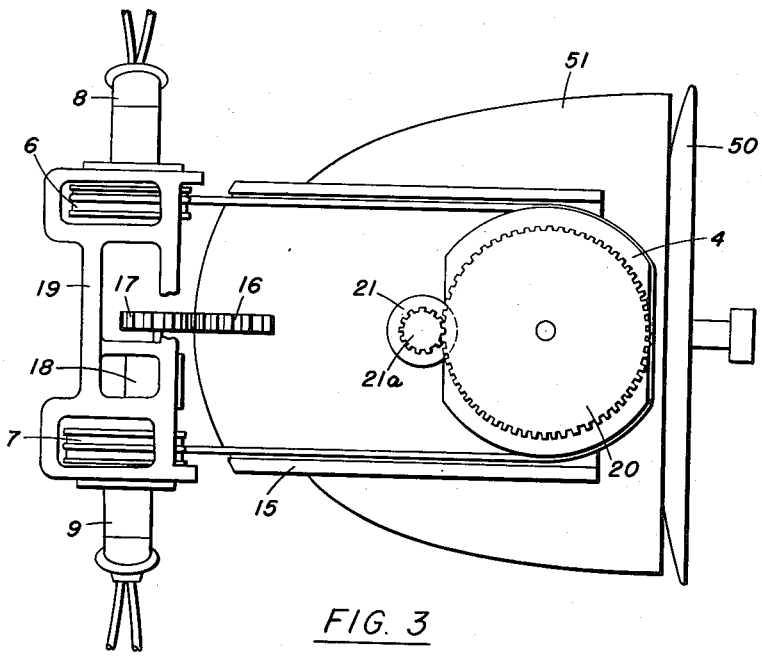
Figure 4:
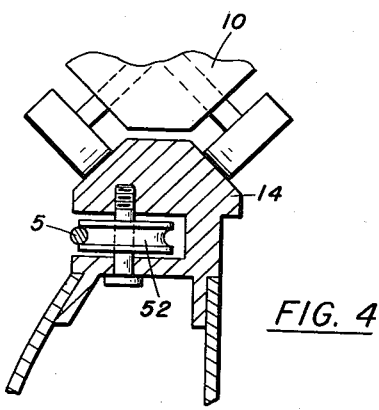

Other objects of invention will become apparent from the following description taken in connection with the accompanying drawings, in which Fig. 1 is a plan view of the invention;
Fig. 2 is an elevational view of the invention;
Fig. 3 is a side view of the invention;
Fig. 4 is a partial sectional view of the invention taken at 4—4 in Fig. 1;
And Fig. 5 is a circuit diagram of the invention.

Referring now to Fig. 1, a radar antenna 50 and spheroidal eyeball-shaped case 51 containing an antenna oscillating mechanism and other electrical microwave components (not shown) are mounted on stub shafts 1 and 1a supported rotatably on a drum 2 having the shape of a segment of a cylinder and rotatable by means of pulleys 3 and 4 drivingly attached to shafts 1 and 1a outside drum 2. Pulley 4 is attached directly to shaft 1 while pulley 3 drives shaft 1a through a reversing gear train to be disclosed. A continuous cable 5 is wound around and attached to pulleys 3 and 4 and around windlasses 6 and 7 rigidly mounted in the aircraft and rotatable independently by means of hydraulic motors 8 and 9. Drum 2 is supported in the aircraft on roller brackets 10, 11, 12 and 13 which engage tracks 14 and 15 secured to the ends of drum 2 and shown in detail in Fig. 4. Cable 5 slides along drum 2 in fair-leads 52 shown in detail in Fig. 4, but, for clarity, omitted in the other figures. Partial gear 16 rigidly attached to drum 2 engages gear 17 adapted to rotate angular pickoff 18 supported in frame 19 which is attached to the aircraft structure and supports hydraulic motors 8 and 9. Pickoff 18 is an azimuth pickoff whose electrical output indicates the azimuth angle through which the drum has been rotated.

Referring to Fig. 3, a gear 20 is attached to pulley 4 and, by means of gear 21a, drives elevation pickoff 21 which, by its output, indicates the angle of elevation through which stub shafts 1 and 1a have been turned. Pulleys 3 and 4 are connected by stub shafts 1 and 1a, case 51 and gears 22, 23, 24 and 25, which constitute a reversing gear train for a purpose to be hereinafter disclosed.

Figure 5:
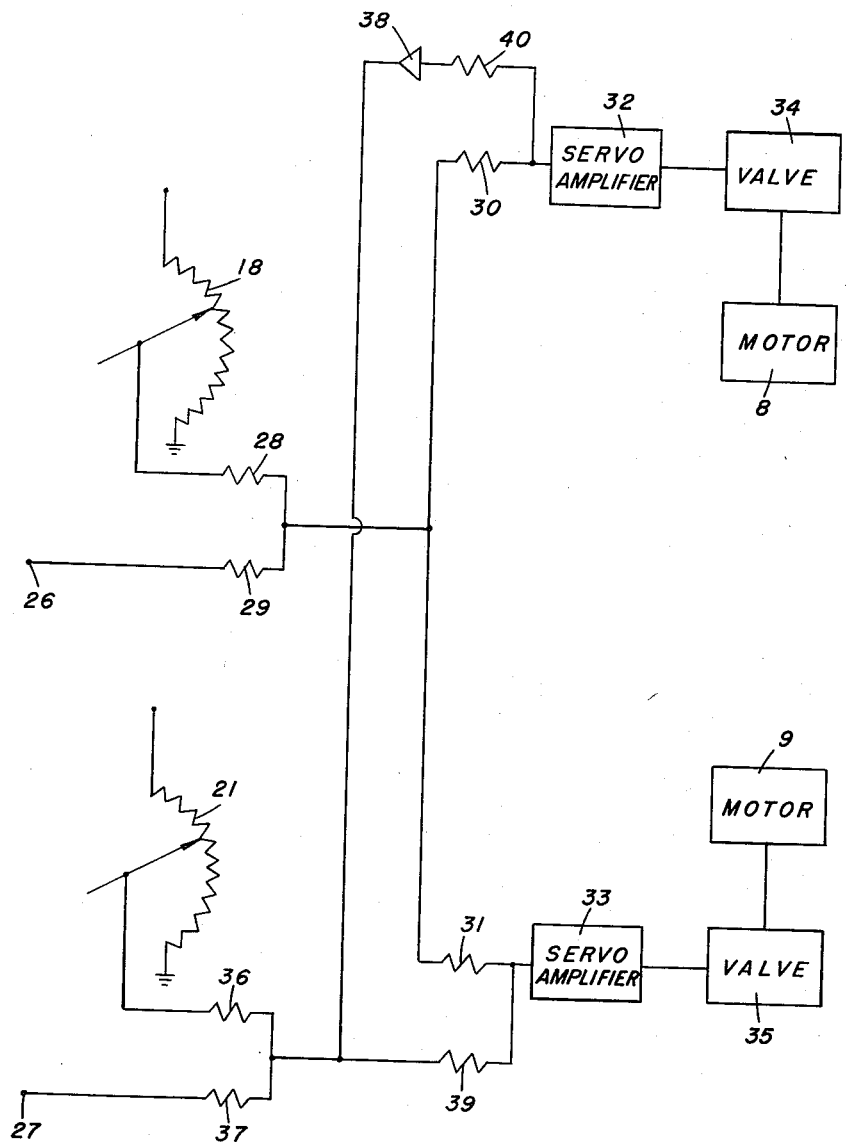

Operation of the invention may be best understood by reference to Fig. 5 taken in connection with the other figures. Let it be assumed that the existing orientation of antenna 50 and case 51 differs from that which is desired. Electrical signals proportional to the desired azimuth and desired elevation are introduced at terminals 26 and 27 respectively. Simultaneously, signals proportional to the actual azimuth and elevation are derived from azimuth pickoff 18 and elevation pickoff 21. It has been assumed that the desired azimuth differs from the actual azimuth.

Therefore, if the polarities of the desired azimuth signal and the actual azimuth signal are opposed, a net signal corresponding in sign to the larger of the two input signals is apparent where resistances 28 and 29 join. This signal is fed through resistances 30 and 31 to amplifiers 32 and 33 which control valves 34 and 35 connected to hydraulic lines which, in turn, control hydraulic motors 8 and 9. In a similar manner, the difference signal between the actual and desired elevation is apparent where resistances 36 and 37 join, and this signal is fed through inverting amplifier 38 and resistances 39 and 40 to servo amplifiers 32 and 33. Note that the motion of motors 8 and 9 is proportional to the algebraic sum of the signals received from the elevation circuit and the signals received from the azimuth circuit. Motors 8 and 9, as is apparent from Figs. 1, 2 and 3, drive windlasses 6 and 7 in the direction required to train, elevate or depress antenna 50 and case 51 in response to the electrical circuit shown in Fig. 5. If motors 8 and 9 turn in the same direction at the same speed, it can be seen that the net motion of antenna 50 is merely a change in azimuth. However, if motors 8 and 9 are operated in opposite directions, but at the same speed, it can be seen that the result is a pure elevation change in the attitude of antenna 50. To combine an elevation and azimuth change it is only necessary to vary the speed and direction of hydraulic motors 8 and 9. Gears 22, 23, 24 and 25, constituting a reversing gear train, are provided so that pulley 3 will always rotate in an opposite direction from pulley 4. This expedient eliminates the possibility of cable 5 piling up on one side or the other of the windlasses. Gears 23 and 24 are rotatable on stub shafts secured to drum 2, while gear 22 is rigidly attached to stub shaft 1. Gear 25 turns with pulley 3 which is rotatable on drum 2 independently of stub shaft 1.

There is thus provided means for mounting a radar antenna in an aircraft in combination with electrical means for rotating said radar antenna in azimuth and elevation through any combination of angles. If the device is situated in the nose of the aircraft, case 51 containing the antenna oscillating mechanism may be very conveniently and compactly fitted within drum 2. The absence of large bending moments and cantilever sections makes the device structurally efficient, and any angle of elevation or azimuth may be obtained quickly by the simple application of the proper electrical signals, as shown in Fig. 5.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for mounting a radar antenna in an aircraft structure and for training and elevating said antenna through any combination of azimuth and elevation angles in response to electrical signals, comprising a shaft for supporting said radar antenna and for elevating and depressing it, a half-cylindrical drum adapted to rotatably support said shaft on a diameter thereof, rollers for rotatably supporting said drum on the periphery thereof about an axis normal to said shaft, a pulley at each end of said shaft mounted outside said drum, a reversing gear train connecting one of said pulleys to said shaft, the other said pulley being connected rigidly to said shaft, windlass means mounted outside and adjacent to said drum on said aircraft structure; a continuous flexible cable fastened to and wound around said pulleys and each of said windlasses; means for controlling the rotation of said windlasses in response to said electrical signals; pickoff means for generating electrical signals proportional to the azimuth of said shaft; pickoff means for generating electrical signals proportional to the elevation angle of said shaft; and means for furnishing to said controlling means electrical signals proportional to the difference between said predeterminable electrical signals and said azimuth and elevation pickoff signals to thereby train said shaft through any predeterminable angle of elevation and azimuth.

2. Antenna mounting means comprising a cylindrical drum, an axle rotatably supported by said drum along a diameter of said cylinder, a plurality of rollers externally supported near the ends of said cylindrical drum, tracks on the ends of said drum adapted to support it for sliding on said rollers, a pulley on each end of said axle mounted outside said drum, a reversing gear train connecting one of said pulleys to said axle, two windlasses with their cylindrical axes parallel to that of said drum, mounted behind and near the edges of said drum, a continuous cable wound around said pulleys and each of said windlasses, and means for turning said windlasses together or in opposite directions with controllable speed to thereby control the azimuth and elevation of any device supported by said axle.

3. Antenna mounting means adapted to train and elevate a radiant energy directing device through any combination of azimuth and elevation angles comprising a cylindrical drum, an axle adapted to support said antenna and rotatably supported by said drum along a diameter of said cylinder, a plurality of rollers externally supported near the ends of said cylindrical drum, tracks on the ends of said drum for supporting it for motion on said rollers, a pulley on each end of said axle mounted outside said drum, a reversing gear train connecting one of said pulleys to said axle, a continuous cable wound around said pulleys in driving relation thereto, two windlasses along said cable between said pulleys for moving said cable, and motor means for turning said windlasses independently or together to thereby control the azimuth and elevation of said radiant energy directing device.

4. A device as recited in claim 3 in which said means for turning said windlasses comprise a hydraulic motor connected to drive each of said windlasses, an electrically actuable hydraulic valve for controlling said motors, and electric means for selectively controlling said valves to thereby train and elevate said radiant energy directing device by remote control.

5. A device as recited in claim 3 and further comprising an electrical angular pickoff on said drum for generating an electrical signal proportional to the elevational angle of said axle, a second electrical angular pickoff for generating an electrical signal proportional to the azimuth of said axle, means for generating electrical signals proportional to the desired azimuth and elevation angles of said axle, and means for actuating each of said motor means by an amount proportional to the difference between said desired azimuth and elevation signals and the azimuth and elevation signals from said angular pickoffs to thereby control electrically the azimuth and elevation of said radiant energy directing device.

6. Means for mounting a radar antenna in an aircraft structure comprising a half-cylindrical drum, an axle rotatably supported by said drum on a diameter thereof and adapted to support said radar antenna, curved tracks on the ends of said drum, roller supports integral with said aircraft structure for supporting said cylindrical drum with freedom of rotation about the cylinder axis of said drum, a pulley on each end of said axle mounted outside said drum, a reversing gear train connecting one of said pulleys to said axle, two windlasses mounted in said aircraft structure with their cylindrical axes parallel to that of said drum and situated behind and near the edges of said drum, a continuous cable wound around said pulleys and each of said windlasses, and means for turning said windlasses independently with predetermined speed and direction to thereby control the azimuth and elevation of said radar antenna.

7. A device as recited in claim 6 in which said means for turning said windlasses comprise a hydraulic motor attached to each windlass, valve means for controlling the flow of hydraulic fluid to said hydraulic motors, and electronic means for controlling said valves to thereby control the azimuth and elevation of said radar antenna.

8. Means for mounting a radar antenna in an aircraft structure and for training and elevating said antenna through any combination of angles of azimuth and elevation in response to predeterminable electrical signals, comprising an axle for supporting said radar antenna, a half-cylindrical drum adapted to rotatably support said axle at the free ends of said drum, a plurality of rollers supported in said aircraft structure near the edges of said drum, tracks on the curved edges of said drum supported on said rollers, a pulley on each end of said axle mounted outside said drum, a reversing gear train connecting one of said pulleys to said axle, two windlasses mounted outside said drum on said aircraft structure, a continuous cable wound around said pulleys and each of said windlasses, a hydraulic motor for turning each of said windlasses, a hydraulic valve for controlling each of said hydraulic motors in response to electrical signals, azimuth pickoff means for generating an electrical signal proportional to the azimuth of said axle, elevation pickoff means for generating an electrical signal proportional to the elevation angle of said axle, and means for furnishing an electrical signal to said valves proportional to the difference between said azimuth and elevation pickoff signals and said predeterminable electrical signals to thereby train said axle through a predeterminable angle of elevation and azimuth.

9. In combination with a radar antenna and microwave equipment for sending a signal out from said antenna and receiving a return echo signal, a radar mount comprising a rigid member having the shape of a segment of a cylinder centered adjacent to the apex of said antenna and adapted to partially surround said antenna and microwave equipment, case means, a shaft connected between said case means and said rigid member upon a diameter of said rigid member for mounting said antenna for angular freedom about said diameter, tracks on the periphery of said rigid member, roller means for supporting said tracks, a first pulley upon one end of said shaft, a reversing gear train upon the other end of said shaft, a second pulley rotatably mounted upon said rigid member and adapted to drive said reversing gear train, a first motor means drivably connected to said first pulley, a second motor means drivably connected to said second pulley for controllably rotating said case within said rigid member and for controllably rotating said rigid member on said tracks whereby said radar antenna is mounted for angular freedom about two axes in a minimum of space and is controlled in both azimuth and elevation by the speed and direction of said first motor means relative to the speed and direction of said second motor means.

WILLIAM D. MULLINS, Jr.
CHARLES K. WEST.
JOHN M. SLATER.
GERALD S. PERKINS.

References Cited in the file of this patent
UNITED STATES PATENTS

| Number | Name | Date |
|---|---|---|
| 2,459,117 | Oliver | Jan. 11, 1949 |
| 2,530,890 | Mattke | Nov. 21, 1950 |